Oct. 7, 1952 W. A. VINSON 2,612,856
SOLDERING UNIT
Filed Dec. 17, 1946 2 SHEETS—SHEET 1

INVENTOR.
WILLIAM A. VINSON.
BY James M. Abbott
ATTY

Oct. 7, 1952 W. A. VINSON 2,612,856
SOLDERING UNIT

Filed Dec. 17, 1946 2 SHEETS—SHEET 2

INVENTOR
WILLIAM A. VINSON.
BY James M. Abbett
ATTY.

Patented Oct. 7, 1952

2,612,856

UNITED STATES PATENT OFFICE 2,612,856

SOLDERING UNIT

William A. Vinson, Madera, Calif.

Application December 17, 1946, Serial No. 716,798

8 Claims. (Cl. 113—111)

This invention relates to a heating device, and particularly pertains to a soldering unit.

When making permanent connections between electrical conductors and other small metal articles it is usual practice to hold the members in fixed relation to each other and to thereafter apply solder to the joint between them as a flame impinges against the joint to complete the soldering operation. Joints of this type are often faulty due to the fact that the flame impinges directly upon the solder and the points being joined, and for the further reason that it is difficult to properly hold the parts in a fixed relation to each other while manipulating the solder and a blow-torch or the like. It is desirable, therefore, to provide a combined structure serving the dual purpose of holding the parts to be soldered and at the same time applying heat thereto without the direct action of a heating flame. It is the principal object of the present invention to provide a portable soldering unit having a vise structure with a heat generating unit incorporated therein whereby articles to be joined in a soldering operation may be gripped and heated by the conduction action of the burner, the said heat unit and gripping jaws being so designed as to prevent direct impingement of the flame at the point of union, and to furthermore make it possible for the burner to be easily adjusted and the gripping jaws to be conveniently set or released.

The present invention contemplates the provision of a fuel tank with which a heat generating unit is connected, said generating unit carrying a pair of gripping jaws at its upper end disposed in a manner to be heated by the flame produced in the heating unit and to impart said heat by conduction to the articles gripped.

The invention is illustrated by way of example in the accompanying drawings in which.

Figure 1:
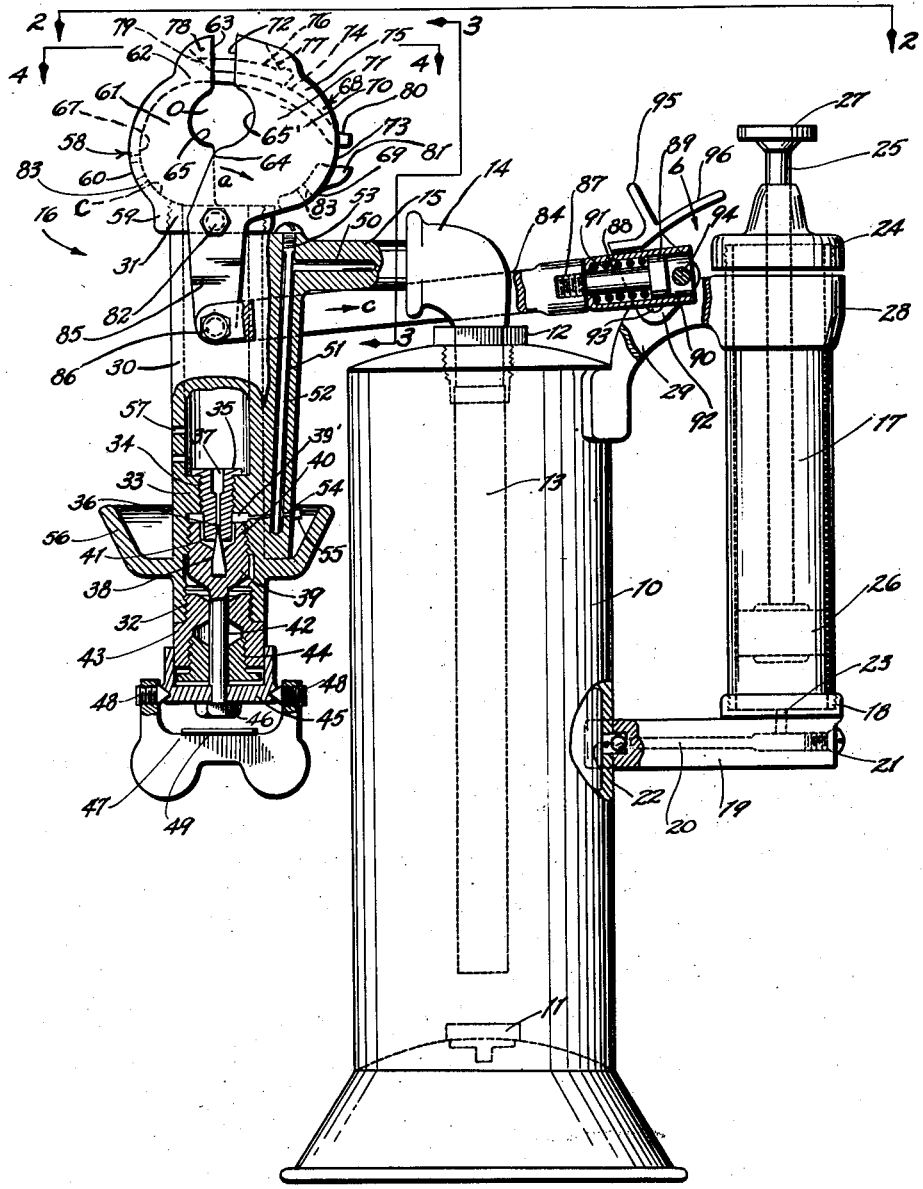
Figure 1 is an enlarged view in section and elevation showing the complete soldering unit with which the present invention is concerned, parts being broken away to indicate the construction of the heating unit.
Figure 2:
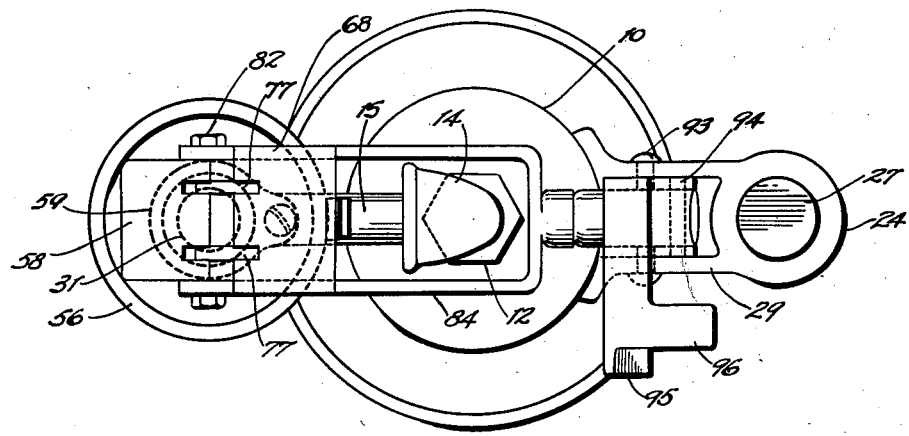
Fig. 2 is a view in plan showing the top of the soldering unit, as seen on the line 2—2 of Fig. 1.

Referring more particularly to the drawings, 10 indicates a storage tank within which a volatile gaseous fuel is stored. This tank is fitted with a threaded plug 11 in its lower end and a threaded coupling 12 in its upper end. Extending downwardly through the coupling 12 is a siphon tube 13, the lower opened end of which terminates near the bottom of the tank. Carried upon the upper end of the siphon tube 13 is a pipe elbow 14 which receives a tubular connection 15 of the heating and vise unit generally indicated at 16. Mounted upon the tank 10 is a cylinder 17 which serves as a handle for the tank and also as the barrel of a pump. This pump is provided with a head 18 at its lower end to which a connecting bracket 19 is secured. The bracket 19 is suitably fastened to the side wall of the storage tank 10 and is formed with an air duct 20 which extends longitudinally thereof and is closed at its outer end by a screw 21. The inner end communicates with the tank 10 through an opening 22. A duct 23 extends upwardly through the member 18 and communicates with the passageway 20. The upper end of the cylinder 17 receives a threaded cap 24 through which a piston rod 25 extends. This rod 25 carries a piston 26 at its lower end. The rod 25 may be reciprocated by grasping the knob 27 and moving the piston rod. The upper end of the cylinder extends through the boss 28 of a bracket 29, which bracket is secured to the side of the tank 10 near the upper end of the tank. Disposed upon the diametrically opposite side of the tank 10 from the bracket 29 is the combined heating unit and vise structure 16. The heating element comprises a tubular cylindrical housing 30 which has an open upper end 31 and an open lower end 32. A partition 33 is formed at a point intermediate these ends. A central threaded bore 34 is formed through the partition and receives a threaded bushing 35 which extends downwardly to a point below the lower face of the partition 33. The lower end of this bushing is formed with a central tapered valve seat 36 which communicates with a fluid passageway 37 extending through the bushing 35. The bushing 35 is preferably silver soldered into place so that it will not become loosened and vary the adjustment. The valve seat 36 is designed to receive a needle valve 38 which is secured within an adjusting cup 39. The adjusting cup is externally threaded and extends into a threaded bore 40 of the burner housing 30. By arranging the members so that the point of contact of the valve 38 and its seat 36 are midway the length of threaded bore 40, expansion and contraction of the valve, due to heat, will be balanced. The upper end of the cup 39 is formed with a central recess 41 into which the lower end of the bushing 35 extends. Formed at the bottom of the recess 41 is a bore into which the base portion of the needle valve 38 is seated. The lower end of the cup 39 is provided with a stem 42 which extends downwardly through a bonnet member 43. This bonnet member is externally threaded at its upper end and engages the internal threads carried at the end 32 of the housing 30. The lower end of the bonnet member is counterbored and internally threaded at its lower end and receives a stuffing gland 44. The stem 42 extends beyond the lower face of the stuffing gland and receives a cup 45 which is keyed upon the stem 42 and is held by a nut 46. A winged handle 47 is secured to the nut by opposite trunnions 48. It will be understood that the winged handle 47 is substantially flat and normally depends in a vertical plane beneath the heating unit. A guard disc 49 is mounted upon the winged handle to prevent the fingers of an operator from touching the hot lower end of the heating unit.

From the foregoing description it will be recognized that the heating unit is of the self-generating type. Fuel under pressure from the tank 10 passes upwardly through the siphon tube 13 and then outwardly through a duct 50 in the connection 15. This duct intersects a downward passageway 51 formed in a rib cast on the side of the housing structure 30. Extending the length of the duct 51 is a stem 52. This stem has a threaded portion at its upper end to engage a threaded bore 53 and to hold the stem centrally of the duct. The stem thus acts to provide an annular fuel passageway having a minimum cross-sectional area. This construction reduces any tendency toward flooding the burner since the flow of fuel will be retarded and will vaporize to create a back pressure against the fuel being fed to the burner. The lower end of the vertical passageway 51 is intersected by a duct 54 which leads into the upper end of the threaded counterbore 39' within which the cup 39 is positioned. A removable screw 55 closes the outer end of the duct 54 and makes it possible for the duct to be cleaned when the screw is removed. Disposed around the housing 30 in a transverse plane below that of the upper end of the cup member 39 is an annular heating pan 56 within which fuel may be burned to heat the burner structure and produce generation of the gaseous fuel. The side walls of the housing 30 may be formed with suitable perforations 57 in the area above the partition 33.

Mounted upon the upper open end 31 of the housing 30 is a fixed vise member 58. This member has a lower threaded boss 59 into which the threaded upper end 31 of the housing extends. The vise member 58 has an outer arcuate wall section 60 and opposite side wall sections 61. Formed integral with the walls 60 and 61 and thereabove is a clamping jaw 62. This jaw has a flat vertical face 63 which lies along the common central plane of the housing 30. The side walls 61 have lower portions 64 which lie along the same plane while arcuate notches 65 are formed in the edges of the side walls 61. It will thus be seen that the fixed vise member 58 is so formed as to define a semi-cylindrical hollow 67 substantially closed at its opposite ends.

Complementary to the fixed vise member 58 is a movable vise member 68. The movable vise member is formed with an arcuate wall section 69 which stands in opposition to the arcuate wall section 60. The opposite ends of the vise member 68 are closed by end walls 70 to form a hollow 71 which is slightly larger than the hollow 67 but is opposed thereto whereby a substantially cylindrical heat chamber C will be provided. Notches 65' are formed in inner edges of end walls 70 which are adapted to cooperate with the notches 65 to form combustion gas outlets O at opposite ends of the chamber C. Formed at the upper edge of the wall 69 is a movable clamping jaw 75. This jaw has a flat face 72 opposed to the flat face 63 of the fixed jaw 62. The arcuate wall 69 of the vise member 68 has an opening 73 through it to receive a tongue 74. This tongue is formed integral with the face 63 of the fixed jaw 62 and therefore provides a bridge across the bottom of the throat which occurs between the fixed jaw 62 and the movable jaw 75. Adjustable lifting members 76 also bridge this gap. These lifting members are articulately connected with the movable jaw 75 and may swing vertically in milled slots 77 formed in the movable jaw 75. The free ends of the members 76 extend into milled slots 78 formed in the fixed jaw 62. These slots, as shown in Fig. 1, have an inclined bottom wall 79 so that the members 76 may raise or lower in direct relation to the movement of the jaws 62 and 75 toward and away from each other. This insures that the members 76 will lift the work to be soldered so that it will be gripped near the upper edges of the gripping faces 63 and 72 to expose the work for a soldering action. It is to be pointed out that the tongue 74 will act as a shield to prevent flame from the heater impinging directly upon the work being gripped. The free end of the tongue 74 extends beyond the outer face of the portion 69 of the movable vise member 68 and provides a jaw 80 which will cooperate with a jaw 81 cast integral with the wall 69. These two jaws will coact to provide a set of hot jaws facing the operator.

The movable vise chamber 68 straddles the vise member 58 and is pivoted relative thereto upon pins 82 carried by the annular portion 59 of the vise chamber 58. It will thus be seen that the end walls 70 of the vise chamber 68 overlap the end walls 61 of the vise chamber 58 and provide a substantially closed heat chamber C beneath the vise jaws 62 and 75. This chamber includes the hollow 67 of the vise chamber 58 and the hollow 71 of the vise chamber 68. Products of combustion are vented through an opening O formed by the cutaway notches 65 and 65' in the end walls 61 and 70. Additional vent openings 83 are also provided and are formed through the arcuate walls 60 and 69 of the two vise members.

The movable vise chamber 68 is actuated by a fork 84 which straddles the elbow 14. The ends of the fork arms are connected to lever arms 85 by bolts 86. The lever arms 85 are formed integral with the side walls 70 of the movable vise chamber 68 and extend downwardly along opposite sides of the burner housing 30. The fork is fitted with a threaded bore 87 to receive a pin 88. The pin 88 is formed with an enlarged head 89 and is adapted to reciprocate within a lock thimble 90. Interposed between the head 89 and the end wall of the thimble is a spring 91 which tends to hold the thimble 90 against the fork 84. The thimble extends between arms of the bracket 29 and is straddled by a lock lever 92 which extends downwardly along opposite sides of the thimble 90 and is pivoted to the bracket by pivot pins 93. The axis of the pivot pins 93 is below the normal longitudinal center line of the thimble 90. The thimble in turn is pivoted to the lever by pin 94, the axis of which is on the longitudinal center line of the thimble. Formed integral with the lever structure 92 is a pair of operating wings 95 and 96. When pressure is exerted downwardly upon the wing 96 the lever will swing upon the pivot pin 93 to move the pins 94 below dead-center. This will produce a longitudinal pull on the fork 84 to swing the vise members 58 and 68 toward each other. When it is desired to release the jaws an upward and forward thrust is applied to the wing 95 to raise the pin 94 and incidentally cause the fork 84 to move forwardly.

Figures 3, 4:
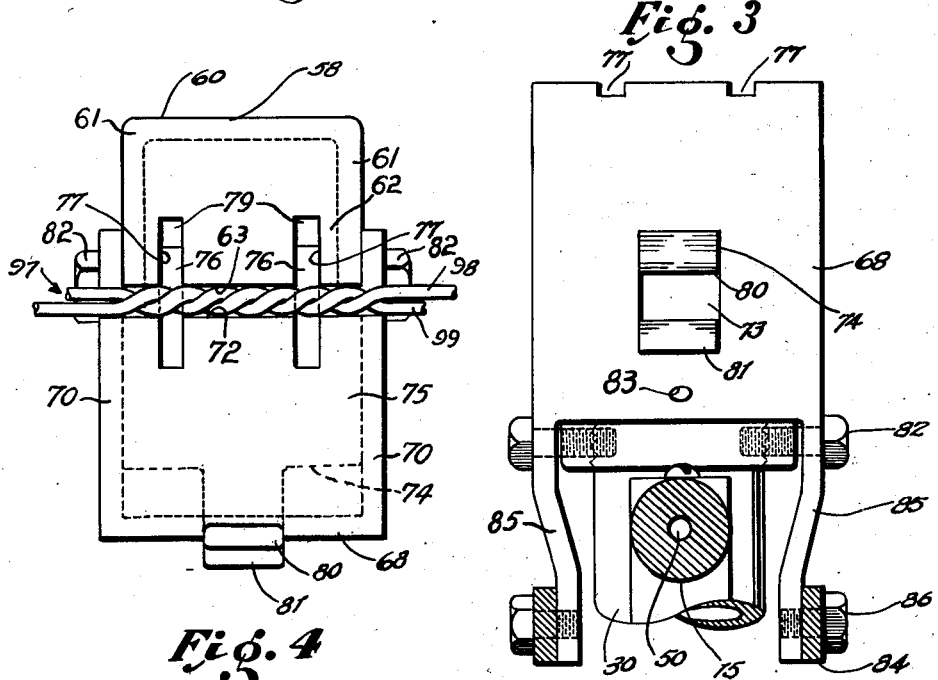
Fig. 3 is an enlarged fragmentary view in vertical elevation showing the gripping jaw structure as seen on the line 3—3 of Fig. 1.
Fig. 4 is an enlarged view in plan as seen on the line 4—4 of Fig. 1 and shows the relationship of the gripping jaws and indicates articles gripped thereby.

In operation of the present invention, the structure is assembled as here shown, after which the storage tank is filled with liquid fuel to a desired level. Air under pressure is then forced into the storage tank by reciprocation of the piston 26 and its piston rod 25. A check valve may be disposed in the passageway 29 to prevent the air from leaking back into the cylinder 17. Liquid fuel may then be placed in the heat generating pan 56 and ignited. The valve stem 42 and the fuel cup 39 may be rotated to retract the needle valve 38 a desired distance from its seat 36. Fuel will then flow into the central portion 41 of the cup 39 from the storage tank 19. This fuel will pass upwardly through the siphon tube 13, then through passageways 50 and 51 into the passageway 54, through which it will flow to the cup 39. When the proper vaporization of the fuel has taken place due to the heat generated in the pan 56 the fuel may be ignited within the housing 30 and a flame will pass upwardly into the chamber C within the vise members 58 and 68. Before or after a suitable degree of heat is attained by the burner the movable vise member 68 may be swung in the direction of the arrow $a$, as indicated in Fig. 1, to separate the faces 63 and 72 of the jaws 62 and 75. It will be noted that as the jaws separate the free end of the member 76 will move down the inclined faces 79 of the grooves 77 and will assume a direct relation with the faces 63 and 72 of the jaws. This will cause the faces 63 and 72 of the jaws and the upper face of the members 76 to form three sides of a substantially square space, into which space a joint 97 formed by two wires 98 and 99 may be disposed. It will be seen that due to the fact that the upper face of the members 76 raises and lowers in direct relation to the degree of separation of the jaw faces 63 and 72 that the joint 97 will be supported near the upper edge of the jaws 62 and 75 irrespective of the diameter of the joint (Fig. 4). This insures that the joint will be gripped at a point where maximum force will be applied and while the joint 97 is being held in an exposed position so that a soldering operation can be performed conveniently. The jaws are moved together by pressing downwardly on the member 96 in the direction of the arrow $b$, as indicated in Fig. 1. This will swing the axis of the pin 94 along an arc concentric with the axis of the pins 93 and will thus pull the fork 84 in the direction of the arrow $c$, as shown in Fig. 1. When the faces 63 and 72 of the jaws 62 and 75 have been moved to an extreme gripping position against the joint 97 it will be necessary for the pin 94 to continue beyond the dead-center plane of the pins 93, in which event the spring 91 must compress appropriately. It will be noted that when the pin 94 has been moved across and below the dead-center plane of pins 93 the fork 84 will be held in a locked position and the vise members 58 and 68 will continue to clamp the joint 97 until the levers 92 are moved to a released position around the axis of the pins 93.

While the joint 97 is held in a clamped position the parts will be heated by conduction. It will be recognized that due to the fact that the tongue 74 spans the space between the jaw faces 63 and 72 at all times there will not be any possibility for a direct flame to impinge against the parts of the joint. This insures that the parts may be heated thoroughly and that solder may be applied easily without working against or through a heating flame. It is also to be pointed out that the burner structure here disclosed protects the valve against damage, insures that it may be adjusted accurately and easily, and furthermore that it will not be moved out of adjustment due to any expansion or contraction of the parts as their temperature changes.

It will thus be seen that the device here disclosed is simple in construction and arrangement, and may be operated directly and effectively to hold and heat a joint while a soldering operation is being performed.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. In a soldering unit, the combination of: a burner having a flame housing extending upwardly therefrom and through which the burning gases of combustion are conducted until the latter are discharged from the upper end of said housing; a pair of vise members pivotally related to each other and mounted upon the upper end of said burner housing, said vise members uniting to form therebetween a relatively confined chamber having an inlet opening connecting with the open upper end of said housing to receive the combustion gases discharged from said burner housing whereby relatively large interior surfaces of said members are exposed to said gases to cause the transfer of a substantial portion of the heat of said gases to said vise members, said chambers also having escape openings for the dissipation of said gases; jaws provided on said vise members; and means causing relative rotation between said members to bring said jaws into gripping relation with a piece of work and to release said jaws from such a relation.

2. A combination as in claim 1 in which said jaws are disposed on the opposite side of said chamber from the open upper end of said burner housing; and a tongue formed on one of said members and extending across the gap between said jaws into a close shiftable relation with the other of said members whereby said tongue is interposed between a piece of work gripped between said jaws and the combustion gases in said chamber to substantially shield said work from direct contact with said combustion gases.

3. A combination as in claim 2 in which a lifting member is pivotally mounted at one end on one of said vise members, said lifting member extending across the gap between said jaws, there being a cam face on the other of said vise members which said lifting member engages to cause said lifting member to be shifted upwardly against the work as said vise members are rotated toward each other, said work thus being pressurably engaged by said lifting member from beneath at the same time said work is clamped between said jaws.

4. A combination as in claim 1 in which a lifting member is supported on said vise members to bridge the gap between said jaws; and cam means for shifting said lifting member upwardly against the work between said jaws as said vise members are rotated together into gripping relation with said work.

5. In a soldering unit the combination of: a pair of articulate vise members having hollows which face each other to conjointly form a heating chamber having an inlet opening through which a flame may be discharged into said chamber, and having outlet means through which gases of combustion may escape from said chamber; a pair of jaws formed respectively upon said pair of members and movable into and away from clamping relation with a piece of work by relative articulation between said members; a tongue formed upon one of said members to extend across the gap between said jaws and have sliding relation with the other vise member to substantially block access of the combustion gases in said chamber to said gap; and means for causing said articulation whereby said jaws grip work therebetween or release the same.

6. In a soldering unit, the combination of: a burner including a flame housing extending upwardly therefrom, the upper end of said housing having a discharge opening through which the burning gases of combustion in said housing are discharged; a pair of vise members pivotally related to each other, one of said members being mounted upon the upper end of said burner housing, said vise members uniting to form therebetween a relatively confined chamber having an inlet opening connecting with said discharge opening whereby said combustion gases are discharged from said burner housing into said chamber, said chamber also having escape openings for the dissipation of said gases; a pair of jaws formed respectively upon said pair of vise members and movable into and away from clamping relation with a piece of work by relative rotation between said members; and means causing relative rotation between said members to bring said jaws into gripping relation with a piece of work and to release said jaws from such a relation.

7. A combination as in claim 6 in which one of said jaws is provided with a tongue which underlies the gap between said jaws and has a sliding relation with the other of said jaws to substantially block access of the combustion gases in said chamber to said gap.

8. A combination as in claim 1 in which a pair of lift members are shiftably mounted on said jaws to cross the gap between said jaws; and cam means for shifting said lift members upwardly to press against work as said jaws are shifted into gripping relation with said work.

WILLIAM A. VINSON.

REFERENCES CITED

The following references are of record in the file of this patent:

UNITED STATES PATENTS

| Number | Name | Date |
|---|---|---|
| 132,658 | Gregg | Oct. 29, 1872 |
| 880,048 | Stein | Feb. 25, 1908 |
| 1,215,802 | Haven | Feb. 13, 1917 |
| 1,332,937 | Van Viersen | Mar. 9, 1920 |
| 1,527,269 | Peterson | Feb. 24, 1925 |
| 1,629,628 | Kelvie | May 24, 1927 |
| 2,261,015 | Brody | Oct. 28, 1941 |
| 2,311,433 | Dershem | Feb. 16, 1943 |
| 2,328,271 | Greene et al. | Aug. 31, 1943 |